H. E. WOOLNER.
BEAN CLEANING DEVICE.
APPLICATION FILED DEC. 28, 1915.
1,299,278. Patented Apr. 1, 1919.
2 SHEETS—SHEET 1.
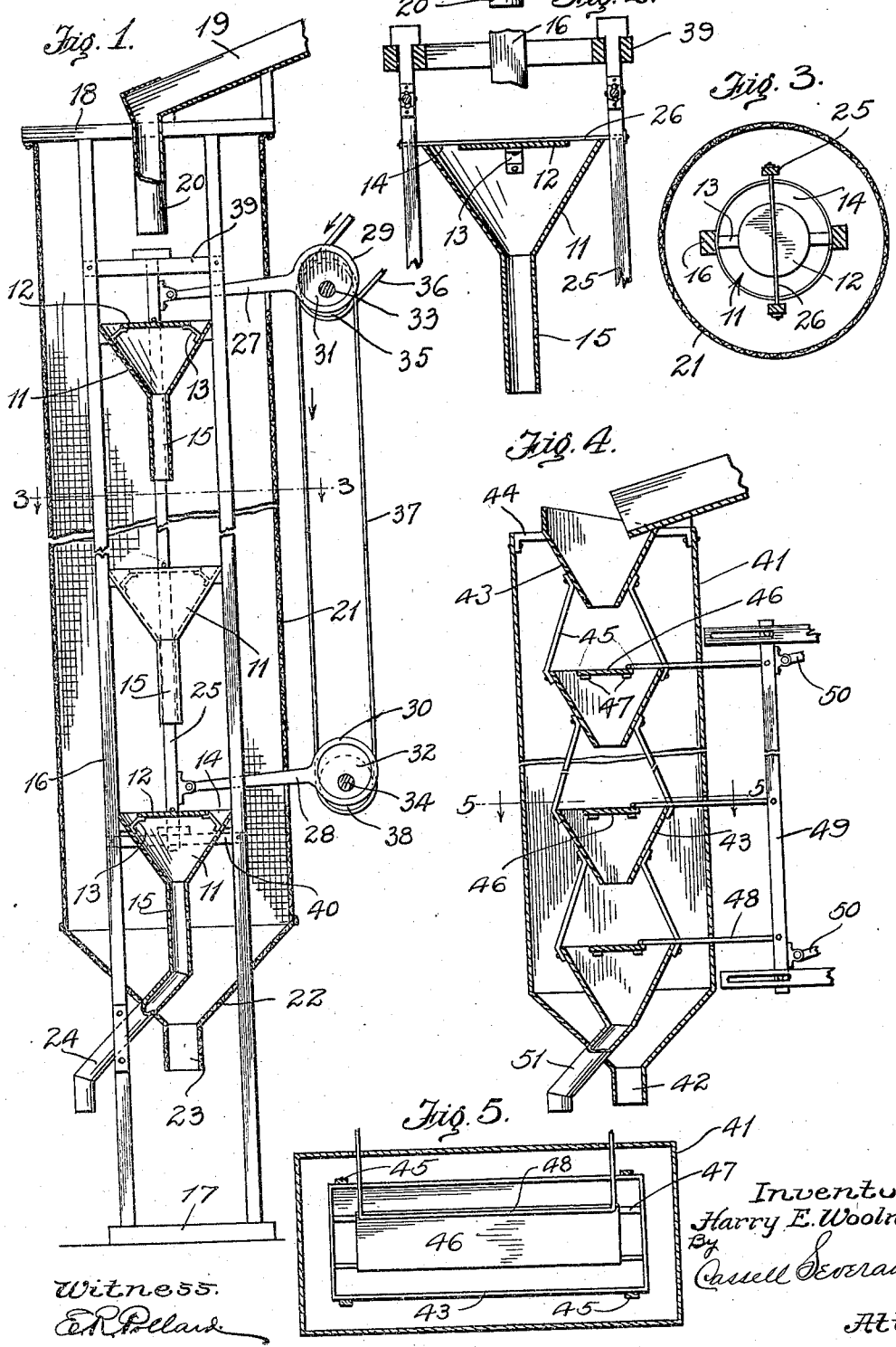
Witness.
E. R. Pollard
Inventor.
Harry E. Woolner
By Cassell Severance
Atty.

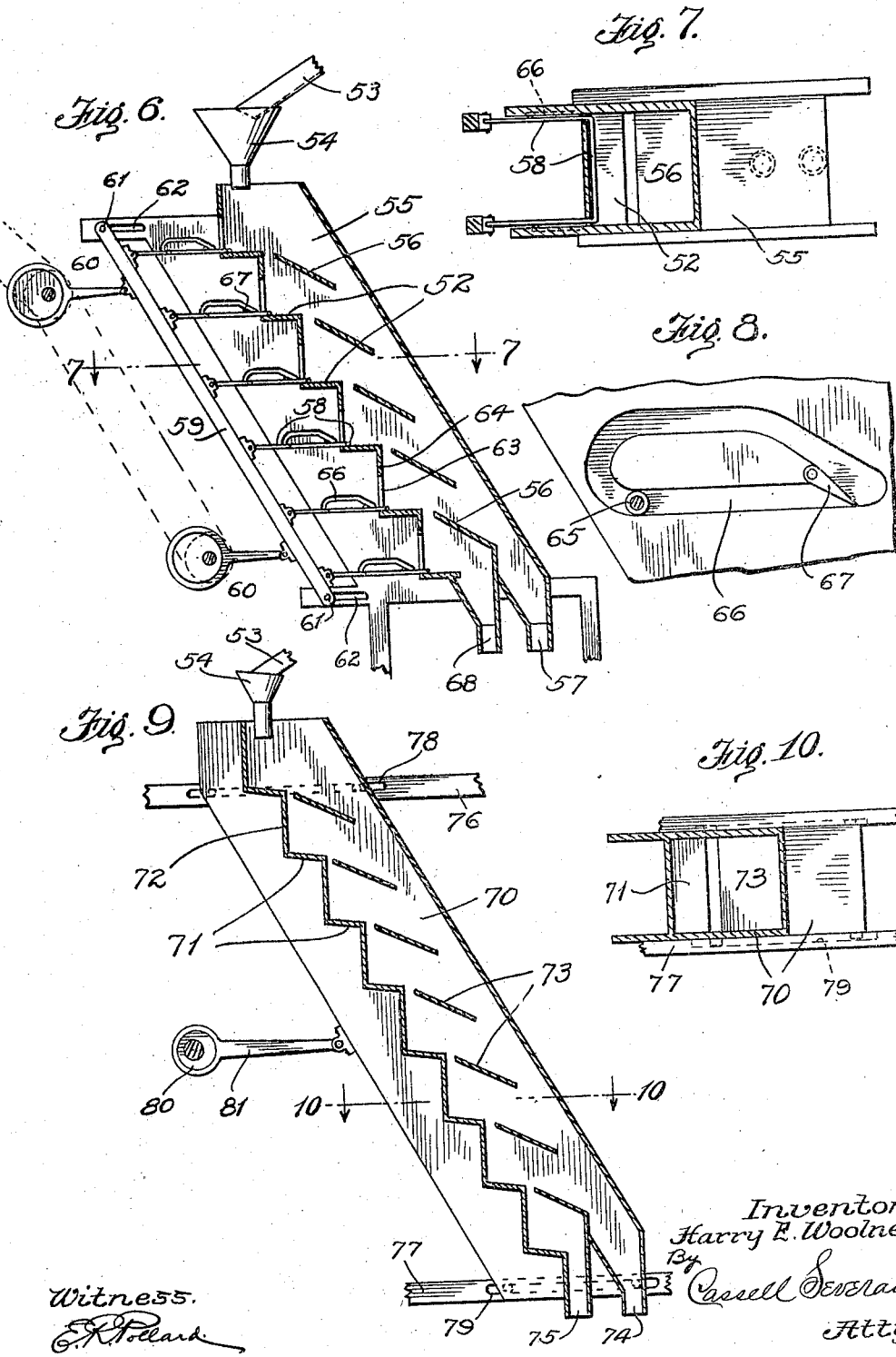

UNITED STATES PATENT OFFICE.

HARRY E. WOOLNER, OF LOS ANGELES, CALIFORNIA.

BEAN-CLEANING DEVICE.

1,299,278.   Specification of Letters Patent.   Patented Apr. 1, 1919.

Application filed December 28, 1915. Serial No. 69,129.

*To all whom it may concern:*

Be it known that I, HARRY E. WOOLNER, a citizen of the United States, residing at Los Angeles, in the county of Los Angeles and State of California, have invented certain new and useful Improvements in Bean-Cleaning Devices, of which the following is a specification.

This invention relates to improvements in bean, grain, seed or other material cleaning devices, and it is particularly adapted for the cleaning of beans and separating dirt therefrom before the beans are put upon the market.

It is an object of the invention to provide means whereby advantage may be taken of the difference in elasticity between the beans or other seed, and the dirt which may have gotten into or been mixed with the same.

It is also an object of the invention to provide a plate upon which the beans and dirt may be deposited, means being also provided for receiving separately the beans as they bound from said plate and the dirt or foreign materials that will remain upon the said plate due to its inelastic properties.

With the above and other objects in view the invention consists of certain other novel constructions, combinations and arrangements of parts as will be hereinafter more fully described and claimed.

In the accompanying drawings:

Figure 1 is a vertical central sectional view through an approved form of device for carrying out the features of this invention, portions of the mechanism being shown in side elevation.

Fig. 2 is a detail sectional view upon an enlarged scale of a portion of the separating mechanism, other parts being broken away.

Fig. 3 is a transverse horizontal sectional view taken upon the line 3—3 of Fig. 1.

Fig. 4 is a vertical longitudinal sectional view through a modified form of the device, portions of the mechanism being shown in side elevation and portions being broken away.

Fig. 5 is a horizontal transverse sectional view taken upon the line 5—5 of Fig. 4.

Fig. 6 is a longitudinal vertical sectional view taken through another form of the cleaning mechanism, portions thereof being shown in side elevation.

Fig. 7 is a transverse horizontal sectional view taken upon the line 7—7 of Fig. 6.

Fig. 8 is an enlarged fragmentary detail sectional view showing one of the guiding paths employed in directing the dirt pushing or scraping device.

Fig. 9 is a longitudinal sectional view taken vertically through a modified form of the mechanism.

Fig. 10 is a horizontal transverse sectional view taken upon the line 10—10 of Fig. 9.

In cleaning certain products of the soil and particularly seeds, grains, beans or the like the process of carrying the cleaning operation into effect has involved a great deal of time and individual labor. Particularly is this so in the cleaning and preparing of beans of various kinds for use. It has been usual to employ pickers to look over the beans and remove or pick out the particles of dirt by hand. It is an object of this invention to avoid the necessity of the hand picking and cleaning of the beans and to provide a mechanism for accomplishing the result in a very effective and expeditious manner. This invention is based upon the discovery that the beans or other seed to be cleaned have a much greater elasticity than the dirt or foreign substances commonly mixed with the beans, so much so in fact, that if the materials are dropped upon a plate of suitable thickness and dimensions, the beans will bound off of said plate, while the dirt and other foreign materials being comparatively inert and inelastic, will remain upon the plate and not bound therefrom.

The invention may be utilized by the employment of different mechanisms, all however based upon the same principle. In the accompanying drawings preferred forms of devices have been illustrated and the details and features of the invention will now be more particularly described reference being had thereto. As disclosed in Figs. 1, 2 and 3 a series of funnels 11 are employed in the upper flaring end of which plates 12 are supported in any desired manner, as for instance by brackets 13, and spaces or openings 14 being left around the said plate and between it and the upper edge of the funnel, of sufficient width to receive the dirt which may be scraped off the plate from time to time. The lower end of the funnel is provided with a cylindrical extension 15 extending downwardly toward the plate and funnel which is mounted immediately below it, the distance being regulated to give a proper drop for the beans and dirt from one plate to the other, whereby the difference in elasticity between the materials may be brought into use as above mentioned for separating them. There may be any desired number of plates and funnels, there being three shown in the drawing, as indicated by the central broken away portion of the apparatus. The said funnels may be mounted upon a frame made up of vertical standards 16 resting upon a base 17 and having a cross bar or framing 18 at the top. Any suitable trough 19 may be employed at the top of the frame for delivering the beans through a piping or tubular chute 20. Outside the frame and a suitable distance from the standards 16, an outer casing or housing 21 is arranged, and this may be formed of canvas if desired or other similar material or may be made of stiff or rigid material if preferred, as for instance sheet metal of any kind. The lower end of the said housing is contracted at 22 so as to discharge through a spout 23 at the bottom. All the beans which bounce from the plates 12 bounce beyond the edges of the funnels and are collected in the said housing 21 and delivered through the spout 23, separately from the dirt and foreign materials.

The funnels discharge their contents successively upon the plates below them, with the exception of the lower one, which is connected with a spout 24 extending through the walls of the housing and delivering the dirt separately from the beans.

The dirt and foreign materials being of an inert and nonelastic character will remain upon the plates 12 and should therefore be removed therefrom as the cleaning process progresses. In order to accomplish this a moving frame is provided made up of upright pieces 25 connected by cross wires or rods 26 which rest upon the upper surfaces of the said plates 12, one rod or wire being provided for each plate. The uprights 25 are connected by means of pitmen 27 and 28 with eccentric straps 29 and 30 which engage upper and lower eccentrics 31 and 32. The eccentrics are carried by shafts 33 and 34 which are connected with any suitable source of power not shown. A pulley 35 upon the upper shaft 33 is usually driven by a belt 36 extending to said source of power, and a connecting belt 37 may be used to connect said pulley with a pulley 38 upon the shaft 34 for transmitting motion from one shaft to the other. The upper and lower ends of the upright pieces 25 move in guiding frames 39 and 40 mounted in the upper and lower portions of the standards 16. The action of the eccentrics is thus such as to cause the rods 26 to move back and forth upon the upper surfaces of the plates 12, and thus scrape or draw the materials which have been deposited on the said plates to the edges thereof whereby the materials will drop into the funnels beneath. Ordinarily the beans will bounce beyond the spaces 14 at the edges of the plates. If however, any of the beans have fallen into said spaces they will merely be directed by the funnels to the next plate below where they will again bound and be thrown into the housing 21. By passing the materials through a series of funnels the separation of the beans from the dirt is found to be almost entirely complete, very few beans being lost. The mechanism also operates as a separator of beans which are not perfect from those which are. This results from the fact that beans which have been partially rotted, or which have been perforated or injured by weevils, insects or the like, lose their elasticity and are sufficiently inelastic to permit the whole elastic beans to bound away from them.

As above intimated the mechanism can be somewhat varied and yet produce a separation of the beans and dirt upon the same principle. Thus as shown in Figs. 4 and 5 a housing 41 may be used having a discharge spout 42 at the bottom, a series of elongated troughs 43 being mounted in said housing. The upper trough is supported upon the upper edge of the housing by bars 44 while brackets 45 space the lower troughs 43 with respect to each other, and suspend one from the other. Elongated plates 46 are mounted within the upper ends of each of the lower troughs upon bars 47 whereby spaces may be left entirely around the said plates. Scraping loops of wires or rodding as 48 are employed for moving back and forth upon the said plates to scrape the dirt therefrom. Horizontally moving uprights 49 connected with pitmen 50 and operated in any desired manner may be employed for moving the said scraping loops back and forth over the plates. The lower hopper collects the dirt and foreign substances and discharges the same through any spout 51. The separation of the materials may thus be had in a manner similar to that already described in the funnels.

As shown in Fig. 6, a step like formation of plates may be used in separating the beans and dirt. In such a formation the steps 52 are arranged in stepped relation to each other and the materials are fed through a chute 53 and hopper 54 into a housing 55 in which the stepped plates are arranged. The housing is preferably inclined in the general direction of the step formation. Opposite each step is an inclined partition or plate 56 arranged with a space between its upper edge and the edge of the adjacent plate or step 52. As the materials drop from the hopper 54 or from one step to the other the elastic beans will bounce from the plate beyond the space between the same and the inclined plate 56 so as to be guided by the said plates 56 downwardly in the housing 55, being discharged through an open spout 57 at the bottom. The dirt is pushed off of each step by means of a series of loops or bail shaped wires or rods 58 which are connected with a framing 59 receiving movement from an eccentric mechanism 60, one such mechanism being arranged at the upper and lower ends of the said framing 59. The framing 59 has guiding pins 61 at its upper and lower ends which engage guide slots 62 formed in the extended walls of the housing 55. The bail wires or rods pass through slots 63 in the ends of the rises 64 between the steps and as clearly shown in Figs. 6 and 7. In order not to pull the dirt upon the steps back toward the rises 64, the bail wires or rods forming the scrapers are preferably lifted upon their returned movements, each of said bails having lateral projections provided with an anti-friction roller 65 adapted to engage a directing path 66 formed in the side walls of the housing 55. Pivoted switch pieces 67 at the inner ends of said paths will drop behind the rollers 65 when they have been pushed to their innermost positions and will cause said rollers to move upwardly and return through the upper lap of the guide path 66. It will thus be evident that when the bails or scrapers are removed inwardly they will push all the dirt and materials on the steps off the inner edges thereof so that they will drop down on the next steps. Upon the return movement of the bails they will be lifted out of engagement with the steps so as not to carry any dirt that may have fallen behind them against the rises 64. The dirt and foreign substances will be discharged separately at the bottom of the apparatus through the spout 68.

The step formation of the mechanism may also be still further varied within the spirit of the invention as disclosed in Figs. 9 and 10 of the drawing. In this instance a housing 70 is provided having steps 71 therein and rises 72 between them. The step formation is set in such a position that the steps incline inwardly and downwardly to a slight extent. Bean directing plates 73 are provided for each of the steps just as in the modification shown in Fig. 6 and the said plates will direct the bounding beans into the discharge chute 74 at the bottom of the apparatus. The dirt will be discharged from the steps through the chute 75. When making the apparatus in this form the housing is preferably given a slight vibration, the said housing being mounted in suitable upper and lower framing 76 and 77 respectively which is provided with slots 78 and 79 engaged by projections or pins carried by the housing 70 as indicated in dotted lines in said Figs. 9 and 10. A pitman 81 and an eccentric 80 may be employed for moving the housing back and forth in its guides. The vibration of the housing in this instance causes the dirt and inert materials which fall upon the plates forming the steps, to gradually slide off the said plates and fall to the next ones. Any beans with the materials falling will be caused to bounce in striking the plates and usually will be thrown upon the inclined plates 73 and discharged separately.

The operation of the devices above described will be readily understood from the above statements. The principle of operation is substantially the same in all of these mechanisms, the resilient elasticity of the good beans being utilized for separating them from the defective and bad beans and especially from the inert and inelastic dirt that may be present in the beans before treatment. The plates may of course be made of various materials, but in practice metallic plates of sufficient thickness to be stiff and firm, are found very effective.

It will be apparent that other modifications of the mechanism employed may be used if desired all within the spirit and scope of this invention.

What is claimed is:

1. A bean cleaning device comprising a series of surfaces upon which the beans are dropped, whereby the beans will be permitted to bound from the same and the inert dirt will remain upon them and means for removing the dirt from said surfaces.

2. A bean cleaning apparatus comprising a series of funnels suitably spaced apart, substantially horizontal plates supported in said funnels and adapted to receive the beans to be cleaned whereby the beans will bound from the plates, and means for scraping the dirt from the plates into said funnels.

3. A bean cleaning apparatus comprising a series of plates arranged one above the other in substantially horizontal position, dirt collecting members below the said plates, with a space left between them and the said plates, and scrapers operating upon the said plates for removing the dirt which collects thereon.

4. A bean cleaning apparatus comprising a series of funnels arranged one above the other, and framing for supporting the same, substantially horizontal plates spaced within the upper flaring portions of said funnels, laterally arranged members moving upon the said plates and means for moving said laterally arranged members back and forth whereby the materials collecting upon the plates will be scraped into the funnels, and an outer casing for collecting the beans.

5. A bean cleaning apparatus comprising a framing, a succession of funnel shaped collectors arranged one above the other, substantially horizontal members spaced in the said funnel shaped members, an outer casing spaced outside the funnel shaped members whereby the materials rebounding from the plates will be collected therein, scrapers moved back and forth over said plates for pushing the dirt therefrom, mechanism for vibrating said scrapers and separate discharge means for the beans and the dirt.

In testimony whereof, I have hereunto set my hand, in presence of two witnesses.

HARRY E. WOOLNER.

Witnesses:
CASSELL SEVERANCE,
EARLE R. POLLARD.

Copies of this patent may be obtained for five cents each, by addressing the "Commissioner of Patents, Washington, D. C."